Patented Nov. 18, 1924.

1,516,373

UNITED STATES PATENT OFFICE.

LOUIS DE MONTMORENCY CATTLEY, OF LLANDAFF, NEAR CARDIFF, WALES.

ACCUMULATOR PLATE.

No Drawing.   Application filed December 31, 1921.   Serial No. 526,315

*To all whom it may concern:*

Be it known that I, LOUIS DE MONTMORENCY CATTLEY, a British subject, residing at 36 Palace Road, Llandaff, near Cardiff, Wales, have invented certain new and useful Improvements in Accumulator Plates, of which the following is a specification.

In the manufacture of accumulator plates, the use of manufactured lead sulphate as a starting material is usually found to be impracticable owing to its inertness and to the fact that it is exceedingly difficult to free from moisture. Litharge or other oxide is therefore uusally employed, the litharge being subjected to the action of sulphuric acid during manufacture and when put into use. Alternatively it has been proposed to use a mixture of lead oxide and lead sulphate.

According to the present invention, I form accumulator plates from a mixture of litharge (or other oxide of lead) and lead sulphate formed into a paste with potato and sulphuric acid and baked. I find that an intimate mixture of litharge and lead sulphate is readily susceptible to drying as the litharge appears to provide avenues of escape for the moisture contained in the sulphate; and on the other hand the lead sulphate prevents the paste from cracking during baking and also protects the litharge to some considerable extent against undesired physical or chemical change during baking. Further, the finished plate is self supporting, extremely sensitive, and of high porosity. It gives a much bigger output of ampere-hours per pound weight than plates formed from the previous processes, and has a much longer life and is more free from liability to derangement than ordinary plates.

As an example of the preferred manner of carrying the invention into effect, equal parts of litharge and lead sulphate are taken and sifted well and are then mixed with previously boiled or steamed potato in any desired quantity, the whole being formed into a stiff paste with sulphuric acid of 1200 sp. gr. The paste is moulded into plates of the desired size which are formed with the application of light pressure under a letter or other press. The amount of potato used affects the porosity of the finished plate, and I usually employ about 20 per cent by weight.

The moulded plate is then thoroughly dried for a period of about 14 to 21 days so as to be freed from moisture without disturbing the formation of the material.

It is then wrapped in paper and placed in a crucible and tightly packed with soot so as to exclude air from contact with it and is baked. In baking, the plate should be heated gradually to 100° C. so that this temperature is reached after about 3 hours, and then more rapidly to 535° C.—550° C., which final temperature should be maintained for about 3 hours and then gradually reduced, the fall being regulated more slowly than the rise. When the temperature has fallen to not more than 50° C., the furnace may be opened and the crucible removed, and the plate may be unpacked and ground or rubbed to remove the scale. It then requires to be purified.

Purification may be effected by immersing in a bath of sulphuric acid in electrical connection with a zinc plate; sulphuretted hydrogen is then evolved, and the immersion should be continued until this ceases and until the bath, which should preferably be changed several times, ceases to be discoloured.

Alternatively, purification may be effected by connecting with one or two correspondingly sized positive plates and charging from a source of electricity until the evolution of sulphuretted hydrogen gas ceases and the electrolyte ceases to be discoloured. The plate is then ready for use.

Owing to its high porosity and consequent greater output, it is possible to use this plate as a negative plate with a single positive plate of similar manufacture, and it can be used with positive plates of ordinary construction. Also, I may form a negative plate of cylindrical shape, and the positive plate may then be annular and surround it. Further, if necessary, the present plate may have a hollow interior in either the laminar or cylindrical form. Any other convenient shape may be employed as found suitable; and the proportions of the ingredients may be varied if desired.

I claim:—

1. A process for making accumulator plates consisting in forming an intimate mixture of pre-formed lead sulphate and an oxide of lead into a paste with cooked potato and sulphuric acid, moulding into blocks and baking out of contact with air.

2. A process for making accumulator plates consisting in forming an intimate mixture of pre-formed lead sulphate and litharge into a paste with cooked potato and sulphuric acid, moulding into blocks and baking out of contact with air.

3. A process for making accumulator plates consisting in forming an intimate mixture of equal parts of litharge and lead sulphate into a paste with 20 per cent by weight of cooked potato, and sulphuric acid, forming into blocks and baking to a temperature of 535° C.—550° C. out of contact with air.

4. An accumulator plate, comprising a paste to be baked out of contact with air, and including pre-formed lead sulphate, oxide of lead, carbonaceous material resulting from cooked potato, and sulphuric acid.

In testimony whereof I affix my signature.

LOUIS de MONTMORENCY CATTLEY.